United States Patent [19]

Henry

[11] Patent Number: 4,931,333
[45] Date of Patent: Jun. 5, 1990

[54] THERMAL PACKAGING ASSEMBLY

[76] Inventor: D. Lindley Henry, 2733 Shelter Island Dr., Suite 318, San Diego, Calif. 92106

[21] Appl. No.: 243,207

[22] Filed: Sep. 9, 1988

Related U.S. Application Data

[63] Continuation of Ser. No. 8,545, Jan. 29, 1987, abandoned, which is a continuation-in-part of Ser. No. 779,146, Sep. 23, 1985, abandoned.

[51] Int. Cl.$^5$ .................... F25D 3/08; F25D 5/00
[52] U.S. Cl. ............................................ 428/76; 62/4; 62/530; 206/584; 220/426; 220/428; 428/402; 428/402.2; 428/34.8
[58] Field of Search ............... 206/584; 220/426, 428; 428/76, 402.2, 402, 34.8; 62/4, 530; 252/67, 70, 71

[56]  References Cited

U.S. PATENT DOCUMENTS

| | | | |
|---|---|---|---|
| 2,547,886 | 4/1951 | Poux | 62/530 |
| 2,602,302 | 7/1952 | Poux | 62/530 |
| 2,800,456 | 7/1957 | Shepherd | 252/70 |
| 3,389,534 | 9/1965 | Pendleton | 206/584 |
| 3,463,161 | 8/1969 | Andrassy | 252/70 |
| 3,913,559 | 10/1975 | Dandliker | 62/530 |
| 4,272,572 | 6/1981 | Netherly | 428/36 |
| 4,324,111 | 4/1982 | Edwards | 62/530 |
| 4,325,230 | 4/1982 | Driscoll et al. | 62/530 |
| 4,341,649 | 7/1982 | Burns et al. | 252/70 |
| 4,377,075 | 3/1983 | Russo | 62/530 |
| 4,404,820 | 9/1983 | Romaine | 62/530 |
| 4,513,053 | 4/1985 | Chen et al. | 428/221 |
| 4,524,565 | 6/1985 | Palm | 426/411 |
| 4,619,678 | 10/1986 | Rubin | 62/4 |
| 4,700,706 | 10/1987 | Münch | 62/530 |
| 4,708,812 | 11/1987 | Hatfield | 252/70 |
| 4,741,176 | 5/1988 | Johnson et al. | 62/530 |

FOREIGN PATENT DOCUMENTS 1185811  3/1970  United Kingdom .............. 62/530

Primary Examiner—Jose Dees
Assistant Examiner—Archene A. Turner
Attorney, Agent, or Firm—Brown, Martin, Haller & McClain

[57]  ABSTRACT

A reusable thermal packaging assembly comprises a plurality of capsules each having a flexible outer skin containing a thermal controlling agent which can maintain a predetermined temperature range for an extended period of time. The capsules are packed around one or more items which are to be maintained in a controlled temperature environment over an extended period, and are designed also to provide cushioning of the or each item against shocks. The capsules may be used with a suitable insulated container or may be provided in a continuous sheet in bubble pack form to be wrapped around items to be packed.

11 Claims, 1 Drawing Sheet

THERMAL PACKAGING ASSEMBLY

REFERENCE TO RELATED APPLICATIONS

This application is a continuation of application Ser. No. 07/008,545 now abandoned, which was a continuation-in-part of application Ser. No. 779,146, filed Sept. 23, 1985 now abandoned.

BACKGROUND OF THE INVENTION

The present invention relates to thermal packaging assemblies for any items which are to be packed in a thermally controlled environment for extended periods of time, such as foodstuffs, beverages, plants, other biological materials, medicines or other chemicals, temperature sensitive electronic equipment, tissue specimens, and so on.

The use of refrigerants to keep items or products cool over extended periods of time is widespread, both for transportation of heat sensitive or heat damageable products and for long term storage of such products. Refrigerators and refrigerated transport systems can be used on the large scale for storage and transportation, but less massive and expensive coolant systems are required for smaller scale purposes, for example short haul delivery systems, airline transportation, and home and recreational cooling of foods, beverages and the like.

The packing of temperature sensitive products such as foodstuffs, pharmaceuticals, plants, biological materials and the like in ice or dry ice to maintain their temperature over a prolonged period of time is well known and has been used extensively for many years. For example, the general public widely uses insulated containers or cool boxes packed with ice to maintain foodstuffs and beverages cool when camping, travelling or on picnics and the like. Commercially, ice is used in packing foodstuffs, flowers, plants and the like for transportation and storage until sold or until placed in a refrigerator in a store, for example. In the medical field, ice is used to reduce trauma, swelling and pain from injuries of all kinds, and is also used in transportation and storage of blood, tissue, organs, pharmaceuticals and the like. Ice or dry ice is also used in transport and use of heat sensitive equipment or instruments, and ice baths and controlled chemical reactions.

The use of ice or dry ice as a coolant material serves as a preservative in many cases and inhibits the growth of many harmful micro organisms. Another coolant in common use, particularly in cool boxes used for recreational purposes, is the so called "blue ice", which is a block or bag of coolant material which is frozen solid before being placed in a container such as a cool box to maintain foodstuffs or drinks in the container cool for extended periods of time.

The major drawback to the use of ice as a coolant material is that it melts. The space taken up by the ice when melted will be less than when it is frozen, so that it will no longer be an effective packing material. The melted ice is easily contaminated by microorganisms and, since it will be in intimate contact with the products it is protecting, these are also liable to become contaminated. They may also be damaged by getting wet. If the products to be protected cannot tolerate wetness, they must be protected from melted ice in some way, for example by the use of raised shelves in cool boxes for placing foodstuffs above the level of the ice or by some sort of waterproof packaging before they are packed in the ice. The melted ice will also allow the products to move or slosh around in the container, risking damage by impact with the walls of the container. The container itself must also be waterproof.

Dry ice has similar problems, in that it is converted into $CO_2$ with time and thus the gas must be dissipated and the product will no longer be packed against movement in its container. Both water and dry ice can be used only once, adding to the expense of thermal storage.

In contrast, blue ice can be used repeatedly by refreezing the contents of the bag or block, but is brick hard when frozen into a solid block and is unable to conform to the shape of products to be kept cool in this state. Thus it does not maintain good contact with unevenly shaped products over a large portion of their surface area. It will become soft and pliable as the material melts within the bag.

Neither ice nor "blue ice" is shock absorbant when activated or frozen and they are therefore not ideal packaging materials, particularly of relatively fragile items or articles of complex and non uniform shapes.

SUMMARY OF THE INVENTION

According to the present invention a thermal packaging assembly is provided which comprises a plurality of capsules each comprising an outer skin of flexible material and each containing a thermal controlling agent for maintaining a predetermined temperature range for an extended period of time, and a means for containing or packing the capsules around one or more items to be maintained in the predetermined temperature range for a certain time period. The individual capsules are of relatively small dimensions as compared to the item or total volume of items to be packaged. The capsules are shaped to resist close packing with one another, so that there will always be large amount of air space surrounding each capsule when packed. Since the capsules will be packed relatively loosely around the item they will be shock absorbing to a certain extent to cushion the packed item against damage, while at the same time protecting against change in temperature for extended periods of time.

The capsules may be packed in a suitable insulating outer container, and they may be separate or connected together in the form of a sheet of bubbles with an interconnecting web. The separate capsules preferably have sloping rounded outer surfaces and will be free to move relative to one another in a planetary motion to dissipate shock when packed around one or more items, so as to provide a relatively good cushioning effect. They may, for example, be of a shape similar to the known poly foam pellets used for packaging, or of arcuate, pillow, ovoid, tubular or other shapes which will resist close packing, i.e. tend to pack together loosely with gaps between adjacent capsules.

The packaging assembly of this invention is therefore an improvement both over known coolants such as ice, dry ice or blue ice, and over known packaging materials which have no thermal controlling properties.

The thermal controlling agent contained in the capsules is preferably a refrigerant although it may be designed to hold items at any chosen temperature, i.e. even at temperatures above the ambient or surrounding temperature. In a preferred embodiment of the invention the agent is a eutectic solution which has the capacity to absorb or release heat with little or no change in temperature while in the process of changing from one physical state to another, e.g. solid to liquid or vice versa. The capsules must first be charged or frozen to the phase change temperature or lower. They will then maintain items around which they are packed in a temperature controlled environment for a time interval dependent on the number of capsules used, the insulating properties of any container in which they are packed, and the surrounding ambient temperature.

Water is one example of such an agent where it will change from a liquid to a solid state at the precise temperature of 32° F. (the phase change temperature). In the preferred embodiment of the invention the agent comprises a mixture of two or more substances which are miscible as liquids but which have a lower freezing point when combined than either of the two substances separately. The point at which both substances solidify is known as the eutectic point.

In one example of the invention the eutectic solution is a solution of a eutectic salt or compound which is formulated to provide good energy storage capability at a given operating temperature. Such compounds may be formulated for storage capabilities at a wide variety of different temperature ranges, and may be used for hot or cold storage according to the eutectic point of the chosen eutectic compound or compounds in the capsules.

The individual capsules or sheet of capsules may be used alone or in combination with dry ice, for example. This avoids the problems of using dry ice alone while allowing its effective cooling period to be prolonged. The capsules may be designed for any specific operating temperatures by suitable choice of the eutectic compound or compounds.

In one particular embodiment the capsules are designed to exhibit a similar cooling temperature range to ice. In this example the thermal storage material in each capsule is a solution of ammonium sulfate, calcium chloride, or other inorganic salt, With the temperature at the eutectic point of the material, i.e. the point at which the solution changes phase, being dependent on the particular salt used in the material. The capsules may also be designed to hold products at higher temperatures with suitable choice of the thermal storage material.

BRIEF DESCRIPTION OF THE DRAWINGS

The present invention will be better understood from the taken in conjunction with the accompanying drawings in which like reference numerals refer to like parts and in which.

DESCRIPTION OF THE PREFERRED EMBODIMENTS

Figure 1:
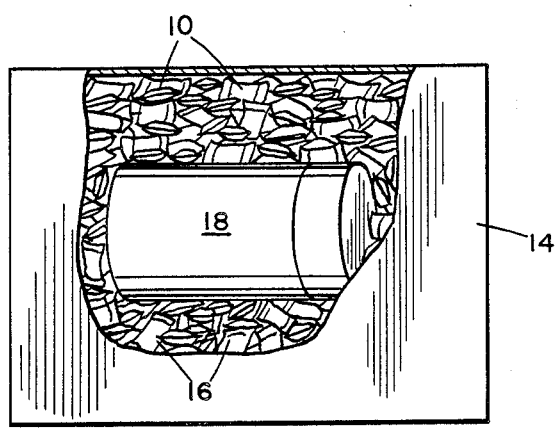
FIG. 1 shows a side elevation view of a thermal packing assembly according to a first embodiment of the present invention, partly cut away to show a suitable item to be packed and thermally protected embedded in the packing material.

FIG. 1 shows a first embodiment of a thermal packing assembly according to the present invention, in which a plurality of capsules 10 containing a thermal controlling agent or refrigerant are packed in a container 14 around an item 18 to be thermally protected.

The item 18 may be anything of a perishable or temperature damageable nature, for example, or anything which is to be kept at a controlled temperature for any reason, and more than one item may be packaged in the capsules. The item or items 18 may for example, be foodstuffs, beverages, plants, biological materials, tissue samples, chemicals, medicines, or live creatures such as bait for fishing. The container may be of any suitable shape and dimensions according to the item or items to be packed, and is preferably insulated.

As shown, the individual capsules are each of dimensions much smaller than those of the item or total volume of items to be packed, and are shaped to resist close packing with one another, so that the capsules packed around the item will have some cushioning effect to protect the item against shocks and can also contact most of the outer surface of the item even if it is of a non-uniform or irregular outer shape. The capsules are shaped so that they will tend to leave gaps 16 between adjacent capsules, having sloping, rounded outer surfaces with air spaces between each capsule and the next adjacent capsule. This will enhance the cushioning effect since capsules will be able to move easily relative to one another to resist or absorb shocks.

The capsule dimensions are preferably of the order of one square inch or less but may be larger for larger scale packing and may have dimensions of up to $3'' \times 3'' \times \frac{1}{4}''$, for example. The smaller scale capsules will be filled with 0.5 ml to 2 ml of refrigerant liquid, with larger scale capsules containing up to 20 ml of refrigerant.

Figure 2:
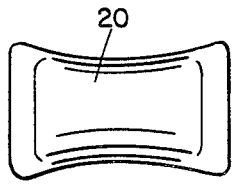
FIG. 2 is a top plan view of a particular configuration of one of the capsules of the packing assembly.
Figure 3:
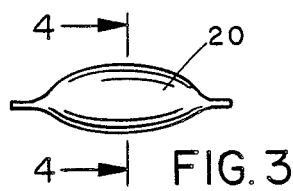
FIG. 3 is a side elevation view of the capsule of FIG. 3.
Figure 4:
FIG. 4 is an enlarged sectional view taken on the lines 4—4 of FIG. 3.

FIGS. 2 to 9 show some of the many possible capsule shapes. FIGS. 2 to 4 show a first possible configuration in which each capsule 20 is tubular with its opposite ends sealed. Such capsules may be manufactured from lengths of tubing filled with a suitable refrigerant 12 (See FIG. 4), which are sealed at suitable spaced intervals, and then cut to form individual capsules. In one specific example of this type of capsule the capsules were made of 1 inch segments of polyethylene tubing having an outside diameter of $\frac{1}{4}''$ and a wall thickness of $1/16''$, filled with approximately 0.5 ml of refrigerant solution. However these specific dimensions may be changed according to the particular applications for which the capsules are to be used.

Figure 5:
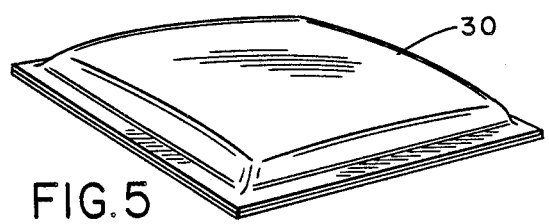
FIGS. 5 to 9 are perspective views of various other possible shapes for the capsules.

FIGS. 5 to 9 show some of the many possible alternative configurations for the capsules. In FIG. 5, the capsule 30 is of generally square or rectangular outline and of pillow like form.

Figure 6:
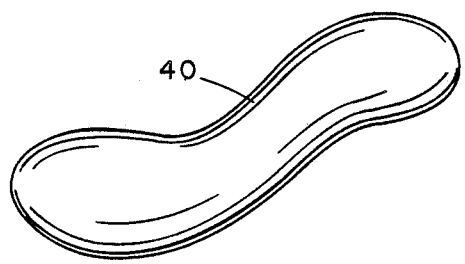
Figure 7:
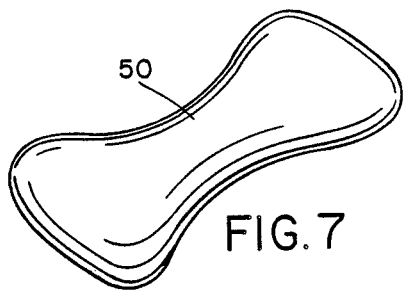
Figure 8:

In FIG. 6 the capsule 40 is of curved or S-like shape, similar to the shape of foam pellets commonly used for packaging. FIG. 7 shows another alternative capsule shape 50 which is of a tubular form with enlarged end portions. FIG. 8 shows a capsule shape 60 of curved, C-shaped form, and in FIG. 9 the capsule 70 is of a star or flower-like form. In each case the capsules may be formed, for example, by moulding the individual capsules from a suitable material and then filling with the refrigerant 12.

The capsules may be manufactured in any suitable manner, including blow moulding, vacuum moulding, machine forming or extruding tubing which is suitably sealed and cut, forming tubing from a continuous film and suitably sealing, filling with refrigerant, and cutting into individual capsules, and die moulding of individual capsules ano filling with refrigerant.

The individual capsules are formed with an outer skin of a suitable non rigid or flexible material which is chosen according to the operating temperature of the assembly in which the capsules are to be used and the refrigerant which the capsules are to contain. The capsules are preferably of a suitable plastics material such as low temperature melting polyethylene, PVC, Teflon (Registered Trademark), polypropylene, polycarbonates, nylon and the like. In one specific example, the capsule outer skin is a laminate of nylon sheet polyethylene adhesive (poly mounted) and 2 mil Canadian Sclair low linear density polyethylene. The capsule skin must be of a material which is resistant to a wide range of temperature variation.

Each capsule is filled with a refrigerant 12 which is chosen according to the desired operating temperature. Although the assembly will normally be used to maintain a temperature controlled environment below ambient temperatures, i.e. as a cooling assembly, it may also be designed for use at temperatures higher than ambient, i.e. for heating or maintaining items at a raised temperature, with suitable use of the agent 12 within the capsules.

The refrigerant 12 is preferably a material which will change from one physical state to another, i.e. liquid to solid or vice versa, at a predetermined temperature, called the phase change temperature. The capsules must first be charged, or cooled to a temperature at or below the predetermined temperature. They must normally be charged at a temperature −20° C. below the holding temperature for periods of between 16 and 20 hours, depending on the total volume of capsules to be charged and their phase change temperature. The capsules will then stay in a certain temperature range for an extended period of time to hold the temperature of an item or items around which they are packed for a time dependent on the insulating properties of any outer container, the number and weight of the capsules used, and the surrounding ambient temperature.

According to the choice of refrigerant material the thermal packing assembly can hold products at various preselected temperatures from −90° C. to +40° C. for periods ranging from a few hours up to nearly 500 hours, according to the number of capsules used and the properties of the surrounding insulated container. With suitable choice of the controlling agent it may even be possible to provide temperature control at any desired temperature in a range from −110° C. to +70° C. The capsules are most efficient when used with a well insulated container.

The thermal controlling agent or refrigerant has the capacity to absorb or release heat with little or no change in temperature while in the process of changing from one physical state to another, i.e. liquid to solid or solid to liquid. It is this property which makes ice such a good refrigerant. Where the refrigerant 12 is water, the capsules will first be frozen at 32° F. The ice must then absorb 144 BTU's of heat energy before it becomes liquid again.

Although water is a possible refrigerant for the capsules, in one preferred embodiment the refrigerant is a eutectic solution, or a mixture of two or more substances which has a lower freezing point, known as the eutectic point, than either of the two substances taken individually. The solution on cooling will transform from a single liquid phase to two or more solid phases at the eutectic point. This is known as a eutectic reaction and may be used to maintain a chosen temperature range in a manner similar to, or even more efficient than ice. The solution may, for example, comprise a mixture or solution of an inorganic salt in water. The salt may, for example, be chosen from the following class: Sodium, calcium, ammonium, or potassium chloride; ammonium, magnesium, or sodium sulfate; potassium or sodium nitrate, among others.

The refrigerant or cooling agent is formulated to maintain specific temperature ranges under controlled conditions, and a range of different capsules containing different agents may be provided for various different applications.

Some specific examples of eutectic and other refrigerants are given below, although other refrigerants or temperature controlling agents can clearly be designed for operation at various temperatures. The refrigerants used are non-toxic and non-corrosive materials, and preferably have high boiling points and low expansion coefficients in both the solid and liquid phase. The refrigerants are preferably of high density with a heat of fusion (heat required for change of state at phase change temperature) of over 100 BTU's per pound.

EXAMPLE 1

Pillow-shaped capsules having an outer skin made up of a laminate of 75 gauge non oriented nylon sheet polyethylene are filled with a 3% aqueous solution of PEG (polyethylene glycol).

The solution may be formulated as follows:

25 pounds of polyethylene glycol 8000 Sentry (Registered Trademark) Grade Carbowax (Registered Trademark)

n flake form (sold by Union Carbide Co.) having a molecular weight in the range from 7000 to 900 combined withy 100 gallons of denionized, U.V. filtered water having a final pH between 6.6 and 7.0.

This product provides a temperature hold between 30.5° F. and 46° F. on a curve similar to that produced by an equivalent amount of ice. When a molded foam container holding 12 pounds of the capsules which were precharged or cooled to below the phase change temperature was left for an extended period, a temperature probe indicated that a temperature of around 30° F. was held for around 75 hours with a surrounding ambient temperature of 72.3° F.

In one example using the 3% solution of PEG as the capsule solution, pillow-shaped capsules of dimensions 1.4 inches by 1.75 inches were each filled with about 6 ml. of solution.

EXAMPLE 2

A solution of 40% propylene glycol; 50% isopropanol; and 10% deionized water, and a flash point suppressant is used to fill the capsules. This provides a temperature hold between −76° F. and −94° F.

EXAMPLE 3

The capsules are filled with an 11% by weight aqueous solution of ammonium sulfate. The capsules are charged by storing for 10 to 16 hours (depending on their total mass) at a temperature of −4° F., for example, in any suitable refrigerator or cooling assembly.

The eutectic or freezing point of the solution is −3.18° C. The ammonium sulfate may be replaced with calcium chloride, for example, or other suitable inorganic salts. The capsules will maintain a constant temperature over a similar period to an equivalent volume of ice. With a surrounding ambient temperature of 21° C. a weight of 5 lbs of the capsules contained in a volume of 432 cu. inches within a container having 3 inch thick urethane walls can hold or maintain refrigerator temperatures in the range from 2° to 8° C. for up to 103 hours, which is equivalent to a similar volume of ice or blue ice while not having the disadvantages of such cooling agents, i.e. melting, non cushioning, and so on.

EXAMPLE 4

In this example the refrigerant is the following mixture:

200 gm polyethylene glycol (PEG) 20% wt. over volume 28.392 gm sodium phosphate diabasic 0.15 molar with pH adjusted to 7.2($Na_2HPO_4.7H_2O$)

19.8 gm ammonium sulfate 0.15 molar in distilled water. The eutectic point of this mixture is −2° C. The holding temperature may be increased or decreased by decreasing or increasing, respectively, the amount of ammonium sulfate or PEG.

Capsules containing this refrigerant contained under the same conditions as the capsules in Example 1 can maintain refrigerator like temperatures for equivalent periods of time and have the additional advantage that the added PEG will pr event the mixture from completely solidifying even when frozen. Thus the capsules will still be malleable, or semi-hard, when charged and will therefore have improved cushioning characteristics.

EXAMPLE 5

The refrigerant in this example comprises N-Tetradecane ($CH_3(CH_2)_{12}CH_3$) This has a phase change temperature of 4.4° C. and under similar conditions to the capsules in Example 1 capsules containing this refrigerant can hold their temperature for about 76 hours and thus have thermal insulating properties for equivalent periods of time.

EXAMPLE 6

In this example the capsules contain ethylene glycol 400, which has a phase change temperature of −12.7° C. This material will still be malleable when frozen and thus the capsules will have improved cushioning characteristics. The capsules must be charged at lower temperatures than the previous examples, for example at −20° C. for up to 16 hours depending on the total mass to be charged. Under equivalent conditions to the previous examples capsules containing this refrigerant will stay frozen for up to 49 hours, and can maintain a lower temperature environment than the previous examples which maintain refrigerator like temperatures.

EXAMPLE 7

In this example the capsules contain N-Hexadecane, which has a phase change temperature of 25° C. This may be used, for example, to maintain temperatures higher than the surrounding ambient temperature over extended periods of time.

Examples 3 to 7 are compared in the following table over different ambient temperatures, with the capsules in each case being precharged to at or below the phase change temperature for a predetermined period of time and being contained as described above in connection with Example 1. The table shows the theoretical holding time in hours which may be achieved by the different controlling agents in each example.

TABLE

| CAPSULE OPERATING TEMP | Average Ambient Temperature (°C.) | | | | | | |
|---|---|---|---|---|---|---|---|
| | HOLDING TIME IN HOURS | | | | | | |
| | −18 | −6 | 4 | 21 | 32 | 38 | 43 |
| −13 (Ex. 6) | 393 | 311 | 125 | 62 | 46 | 41 | 37 |
| −3 (Ex. 3) | 165 | 621 | 340 | 103 | 70 | 61 | 53 |
| 0 (Ex. 4) | 120 | 319 | 478 | 101 | 66 | 56 | 49 |
| 4 (Ex. 5) | 64 | 129 | — | 86 | 51 | 43 | 37 |
| 25 (Ex. 7) | 38 | 53 | 78 | 412 | — | — | — |

The average holding time for any thermal packing assembly can be estimated in advance given the surrounding ambient temperature and the mass of capsules to be used, together with the thermal conductivity of any surrounding insulating container. The holding time will be equal to the heat available divided by the heat loss, which will be dependent on the total volume and the thermal conductivity properties of the container. Thus anyone with a specific packaging and thermal control problem will be able to estimate in advance the probable amount of capsules needed for a particular length of time, and the most desirable thermal controlling agent to use in the capsules. Capsules containing different thermal controlling agents may be mixed together in certain cases to prolong the cooling periods, for example.

Thus the packing assembly described above has the advantage of both cushioning items packed against shocks or damage while maintaining them in a predetermined temperature range over extended periods of time. The amount of capsules needed and the type of refrigerant to be used can be calculated in advance according to the items to be packaged, the expected ambient temperature, and the length of time they are to be maintained in the predetermined temperature range, which will typically be refrigerator temperature or lower. Even when the capsules reach ambient temperatures, they will still have some insulating properties to continue to insulate the packed items to a certain extent, and will still be a good packaging material since there will be little or no change in the volume they displace when the material in the capsules changes phase.

The capsules may be used alone or mixed with another refrigerant. For example, in cases where dry ice ($CO_2$) would otherwise be specified as a coolant, a mixture of dry ice with the capsules may be packed around the item or items to be refrigerated. This would act both to prolong the cold generated by the dry ice and keep it away from direct contact with the item or items.

The material of the capsules is chosen such that the capsules will not stick or adhere to each other or adjacent surfaces, which is a problem with ice and similar coolant materials. The capsules have a non wetting and non wettable surface, so that condensation will be minimal and growth of micro organisms on the surface will normally not be supported.

As described above the shape of the capsules can be chosen so that they resist compaction. Typically the percentage of compaction should be less than one-fifth of the total volume in which the capsules are contained.

The capsules can be reused any number of times simply by recharging them once they have reached ambient temperature. The outer skin is flexible but fairly resistant to tearing. The capsules w ill therefore be relatively inexpensive, particularly when compared to ice and other single use coolant materials, and have a relatively long life.

If the capsules should by some chance be ruptured, the agent inside is chosen to be non toxic, non corrosive, and washable with water. The material of the capsules themselves is also non reactive, non toxic, non corrosive, and non digestible.

The capsules m ay be used as described above in a thermal packing assembly to transport or store any delicate and/or temperature sensitive items, such as perishable foodstuffs, plants, pharmaceuticals and so on. They may be used to store and/or transport frozen foods, biologicals and other frozen materials for 20 to 60 hours at temperatures of $-20°$ C. to $-4°$ C with suitable choice of refrigerant in the capsules. They may be used in place of ice or blue ice for recreational purposes to keep foods and drinks cool on picnics, while camping, or on other outings, for example. Another possible use is to keep bait cool when fishing.

The capsules of this invention may also be used, for example, in ice baths for temperature control of laboratory chemical reactions , for protecting temperature sensitive film, or for treating swelling or other injuries in the form of ice packs. Another possible use is in ice dispenser or storage systems, where packs of ice for use in drinks and the like are stored prior to sale or use.

It can therefore be seen that the capsules of this invention are an extremely versatile, economical and efficient thermal controlling and packing material, which can be designed for packing any number of different types of items and for operating temperatures over a wide range, both below and above ambient.

The capsules need not be contained in a rigid outer container, but may be enclosed around an item or items to be packed by any suitable means, for example as a flexible wrapping.

Figure 10:
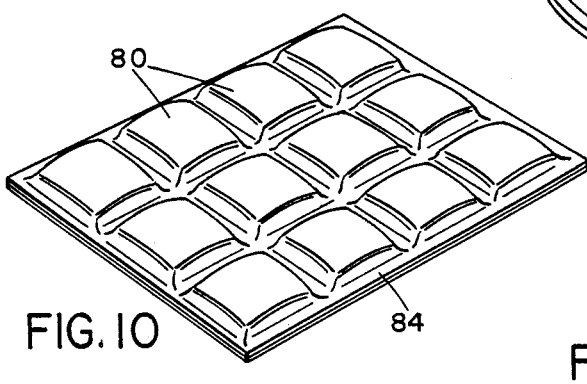
FIG. 10 shows an alternative embodiment of the thermal packing assembly according to the present invention.
Figure 9:
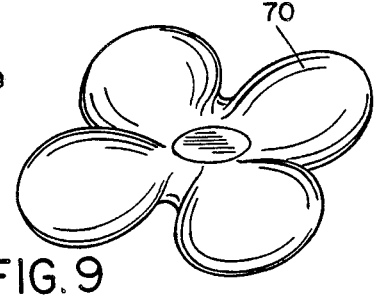

FIG. 10 shows an alternative example of a thermal packing assembly according to the invention. In this example a plurality of capsules 80 containing a suitable refrigerant 82, which may be any suitable material as described above in connection with the previous embodiments, are interconnected in the form of a sheet 84 of bubble pack type material. The sheet 84 may be manufactured in a similar manner to standard bubble pack material, with each bubble or capsule 80 being filled with the refrigerant 82 in its liquid state. The capsules in the sheet may be of any suitable shape. The sheet will be precharged in the same manner as the individual capsules as described above, and then wrapped around an item or items to be packed. The wrapped sheet may be enclosed in an outer container if desired, for added insulation, or it may be secured around the item to comprise the entire packing assembly.

In one possible method of manufacturing pillow-shaped capsules in a continuous sheet as shown in FIG. 10, or as separate capsules as shown in FIG. 5, two continuous sheets of material for forming the capsule wall or skin are used. This may suitably be a laminate of nylon sheet polyethylene adhesive and Sclair, as mentioned in Example 1 above.

The two sheets of material are mounted side by side on rolls above a suitable forming machine, with the low linear density polyethylene layers of the two sheets facing each other. The sheets are then drawn down from the rolls into the machine with the side and bottom edges of the sheets being heat ano pressure sealed together by horizontal and vertical heat/pressure bars. A predetermined amount of the fluid fill is gravity fed into the moving envelope formed by sealing the edges of the envelope, as a set of vertical roller heat/pressure sealer seals the sides of each individual capsule, thus forming a series of vertical columns. A further set of horizontal heat/pressure sealing bars moves downwards to force the fluid fill to press outwards against the walls of the film to produce a pillow-like shape. The next row is then formed in a similar fashion, and so on to form a continuous sheet of pillow-like capsules. Each capsule will be entirely devoid of air.

This sheet may either be cut to selected lengths for use in wrapping items for cushioning and thermal protection, or it may alternatively be cut up along the seal lines to form individual capsules for packaging.

The sheet of capsules shown in FIG. 10 has the capability of multi-dimensional wrapping of any shape of article or articles. It can be bent or folded vertically, horizontally, and on the whether in its liquid or frozen state. Thus it can be closely packed around even relatively irregularly shaped objects, and suitably sized sheet can protect both the sides and ends of an object.

The size of the individual capsule or sheet of capsules is selected according to the particular application. The film and solution described in Example 1 above is approved for use next to food items, and maintains a temperature envelope of 15% or greater than a like amount of gel pack or ice.

The capsules may suitably be provided in three sizes, the smallest size being pillow-shaped capsules having a 6 ml. fill of 3% PEG and outer dimensions of 1.4 inches by 1.75 inches. The larger sizes, which are particularly suitable for packing cut flowers and fresh fish, have a 12 ml. of 3% PEG and a 40 ml. fill of 3% PEG, respectively. The dimensions of these capsules are 1.7 inches by 2.8 inches, and 2.75 by 3.2 inches, respectively. In each case, the liquid filling the capsule forces the outer faces of the skin to cushion outwardly, to form the desired sloping, rounded outer surfaces. The surface configuration will be such that there always be air space around much of the surface of each ¢pillow" when packed. Thus the individual capsules will be free to move relative to one another to absorb shocks, as a result of their sloping, rounded and non wettable contact surfaces.

The liquid filling the capsules is a non electrolyte, non toxic substance, making the capsules suitable for almost any packing application. The capsules are completely reusable making them much more economical for thermal protection than ice, for example. They may be sterilized, if necessary, by most techniques other then autoclave, and will withstand a pressure of 60 psi for 5 minutes or more.

The capsule or capsule sheets may be used for shipping almost any temperature sensitive products, such as foods and other produce, e.g. cut flowers. They can be used to cover fresh produce, and for shipment of medical diagnostic products, biological specimens, and for transport of organs for transplant. The capsule sheets can also be used as hot and cold packs for wrapping around injured limbs and the like, for example for athletes, or for animals.

Although some preferred embodiments of the present invention have been described above by way of example, it will be understood by those skilled in the field that modifications may be made which are within the scope of the present invention, which is defined by the appended claims.

What is claimed:

1. A thermal packaging assembly, comprising
an outer container a plurality of separate reusable capsules in said each container each capsule comprising a continuous outer skin of flexible plastics material and a thermal controlling agent completely filling the capsule, the agent being a liquid in a predetermined temperature range, frozen freezable into a solid phase prior to use in the packaging assembly;
said outer container comprising means for packing the capsules around one or more items to be packed, the container having an opening for receiving the capsules and items to be packed;
the capsules each being of identical shape and dimensions and each having opposed sloping, curved outer surfaces for resisting close packing against adjacent capsules in the packaging assembly and for forming air gaps between each capsule and the next adjacent capsules;
the capsules comprising means for cushioning an item or items around which they are packed, means for absorbing shocks by moving freely relative to one another and means for maintaining a predetermined temperature range for an extended period of time.

2. The assembly as claimed in claim 1, in which the capsules are pillow-shaped.

3. The assembly as claimed in claim 1, wherein the agent comprises an aqueous solution of 3% by weight polyethylene glycol having a molecular weight in the range from 7,000 to 9000.

4. The assembly as claimed in claim 1, in which the agent comprises a solution of 40% propylene glycol, 50% isopropanol, and 10% deionized water.

5. A method of packing one or more items to maintain a predetermined temperature range for an extended period of time and to cushion the item or items against shocks, comprising the steps of:
taking a plurality of reusable capsules each containing a thermal controlling agent which completely fills the capsules and which is a liquid within a predetermined temperature range and has a solid phase and freezing the capsules until the liquid in the capsules solidifies; and
packing the capsules in a container around at least one item to be packed so gaps between the opposed, curved outer surfaces of each capsule and the next adjacent capsules and the capsules are free to move relative to one another to absorb shocks, the capsules maintaining the packed item in a predetermined temperature range for an extended period of time and cushioning the item against shocks during and beyond the extended period of time; and
subsequently reusing the capsules by refreezing them prior to packing them around other items to be packed.

6. A thermal packaging material for wrapping around an item or items, comprising:
a continuous sheet containing a plurality of rows of adjacent reusable capsules, each containing a thermal controlling agent which completely fills the capsules, each row being separate from the next adjacent row by a first set of spaced seal lines and the capsules in each row being separate from one another by a second set of spaced seal lines perpendicular to the first set;
each capsule having a generally rectangular outer periphery and opposing curved outer surfaces on the upper and lower face of the sheet;
the thermal controlling agent being a liquid in a predetermined temperature range and Frozen into a solid phase having malleable characteristics prior to use in the packaging assembly; and
the sheet being selectively bendable when the agent is solidified along both sets of perpendicular seal lines to completely wrap around an item to be packed and an outer enclosure releasably enclosing said sheet.

7. The packaging material as claimed in claim 6, wherein the sheet of capsules is formed from two opposed films sealed together along spaced parallel lines in two perpendicular directions to form separate capsules each having a rectangular outer periphery, each capsule being filled with a liquid forcing the outer opposed surfaces of that capsule outwardly to form a generally pillow-shaped capsule.

8. A packaging material as claimed in claim 6, wherein the thermal controlling agent is a eutectic solution having a liquid phase and at least two solid phases.

9. The packaging material as claimed in claim 6, wherein, the thermal controlling agent is an aqueous solution of 30% by weight polyethylene glycol having a molecular weight in the rangea from 7,000 to 9000.

10. A thermal packaging assembly, comprising:
a plurality of pillow-shaped hollow capsules of flexible plastics material each containing a reusable thermal controlling agent elected from the group consisting of an aqueous solution of 3% by weight polyethylene glycol having a molecular weight in the range from 7,000 to 9,000 which completely fills the capsule leaving no air gaps, and a eutectic solution having a liquid phase and at least two solid phases, the agent being a liquid within a predetermined temperature range;
enclosing means for packing the capsules around at least one item to be packed so that the item is enclosed by and in direct contact with the capsules the capsule being within said enclosing means;
the opposed sloping outer surfaces of the capsules comprising means for resisting close packing and for leaving air gaps between adjacent capsules and between the innermost capsules and the item to be packed.

11. The assembly as claimed in claim 10, wherein the capsule dimensions are in the range one square inch to three square inches, and the capsule thickness is of the order of ¼ inch.

* * * * *

UNITED STATES PATENT AND TRADEMARK OFFICE
CERTIFICATE OF CORRECTION

PATENT NO. : 4,931,333

DATED : June 5, 1990

INVENTOR(S) : D. Lindley Henry

It is certified that error appears in the above-identified patent and that said Letters Patent is hereby corrected as shown below:

Column 11, claim 1, line 13, delete "freezable"

Column 11, claim 5, line 51, after "so" insert
--that they surround the item and there are air--;

Column 12, claim 9, line 36, "30%" should be --3%--.

Signed and Sealed this

Seventh Day of January, 1992

Attest:

HARRY F. MANBECK, JR.

*Attesting Officer*      *Commissioner of Patents and Trademarks*